Sept. 10, 1968     D. W. BOSTWICK     3,400,581
AIRCRAFT FLIGHT CONTROL SYSTEM
Filed March 15, 1966     3 Sheets-Sheet 1
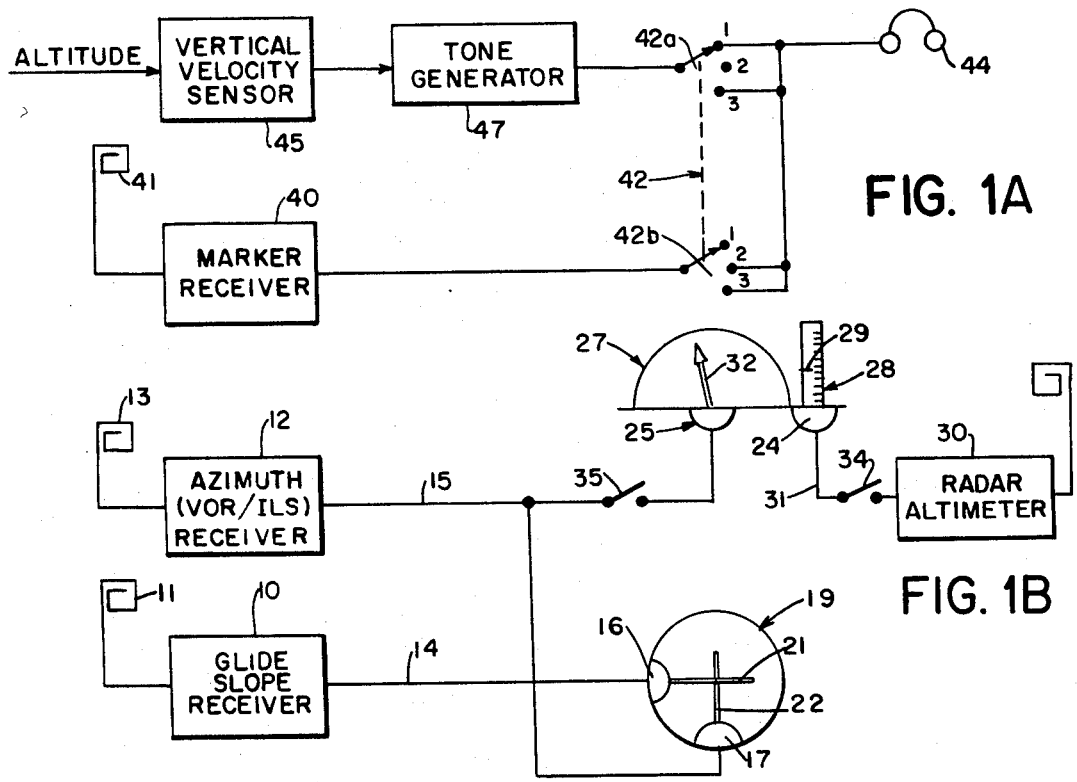
FIG. 1A
FIG. 1B
FIG. 2
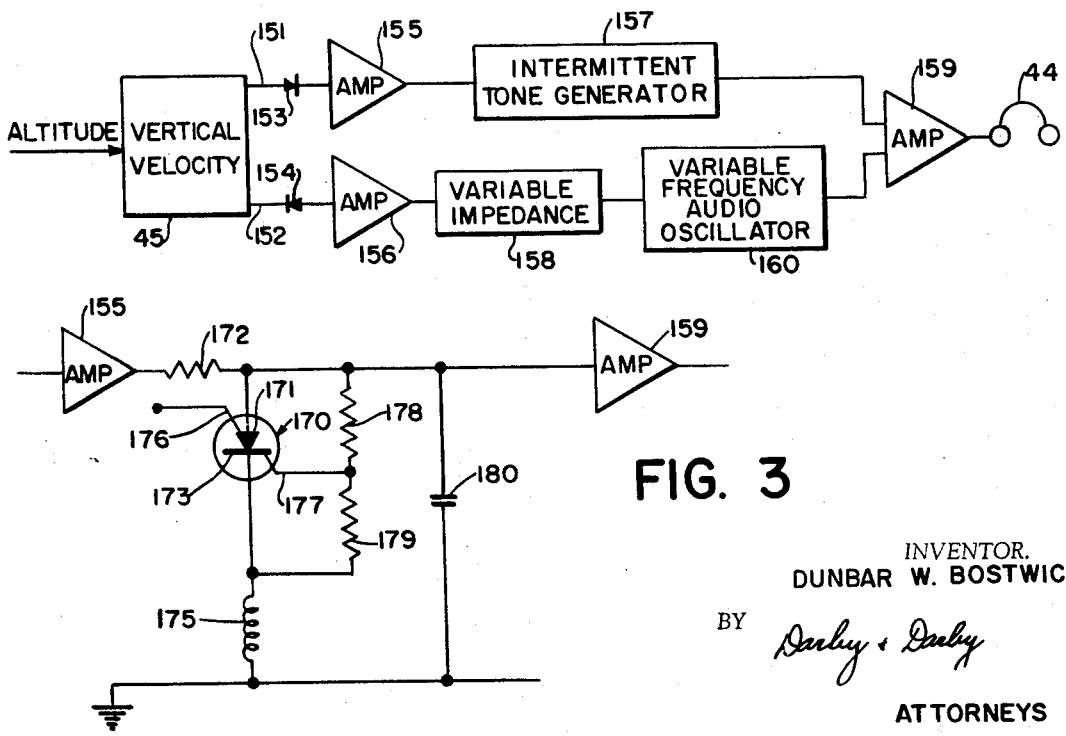
FIG. 3
INVENTOR.
DUNBAR W. BOSTWICK
BY Darley & Darley
ATTORNEYS Sept. 10, 1968 D. W. BOSTWICK 3,400,581
AIRCRAFT FLIGHT CONTROL SYSTEM
Filed March 15, 1966 3 Sheets-Sheet 2
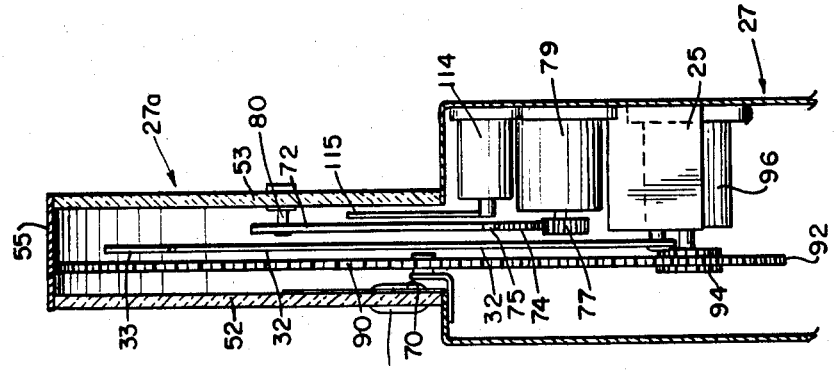
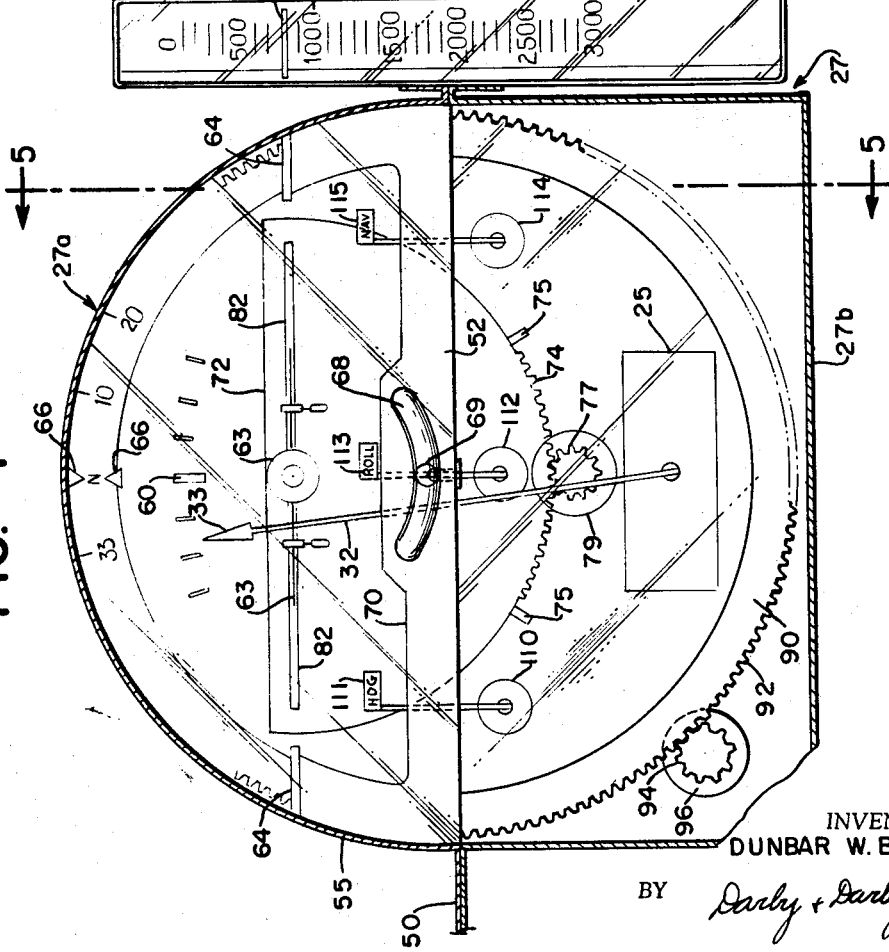
INVENTOR.
DUNBAR W. BOSTWICK
BY Darby + Darby
ATTORNEYS Sept. 10, 1968 D. W. BOSTWICK 3,400,581
AIRCRAFT FLIGHT CONTROL SYSTEM
Filed March 15, 1966 3 Sheets-Sheet 3

INVENTOR.
DUNBAR W. BOSTWICK
BY
*Darby, Darby*
ATTORNEYS

United States Patent Office 3,400,581
Patented Sept. 10, 1968

3,400,581
AIRCRAFT FLIGHT CONTROL SYSTEM
Dunbar W. Bostwick, New York, N.Y., assignor to
Aviation Instrument Manufacturing Corp., Houston,
Tex., a corporation of Texas
Filed Mar. 15, 1966, Ser. No. 534,351
9 Claims. (Cl. 73—178)

ABSTRACT OF THE DISCLOSURE

An aircraft flight control system having a see-through indicator with an altimeter arranged to provide a visual indication of the "decision" altitude and circuits to provide an aural indication of the vertical velocity of the aircraft.

---

Figure 7:
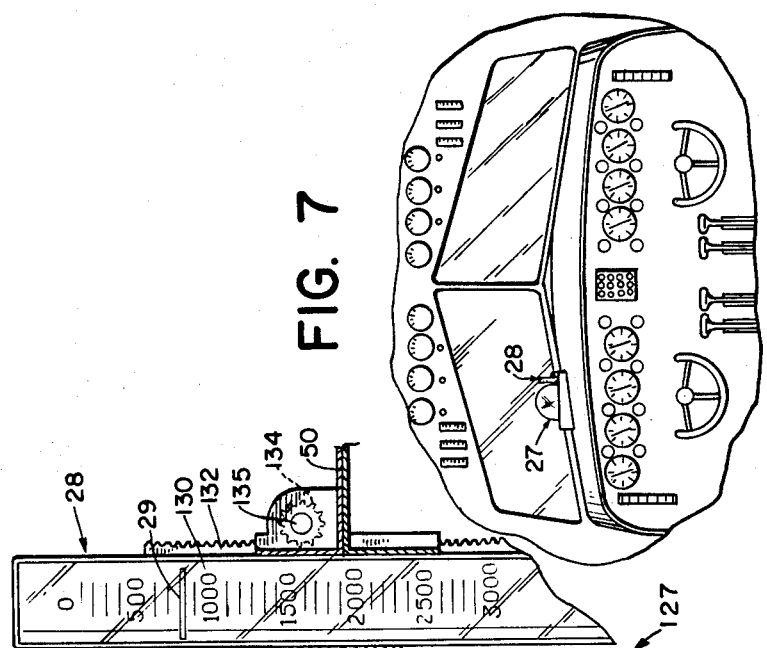

This invention relates to aircraft flight control systems and more particularly to a control system for aiding the pilot in flying the aircraft.

The usual cockpit instrument configuration of an aircraft having equipment such as an altimeter, one or more omnirange (VOR) receivers, a glide slope receiver, and a radio receiver for determining the radio beacon approach "markers" of the instrument landing system (ILS) of an airfield, confronts the pilot with an array of readout instruments which he must visually monitor. The majority of the instruments are usually located in the cockpit below the cockpit cowl and windshield in a position where the pilot must look down to see them. When he does this, his field of view through the windshield is lost.

Loss of visibility by the pilot in this manner is particularly disadvantageous during landings, particularly in landing approaches made under instrument flying conditions. In any landing, the pilot of the aircraft must continually monitor his air speed to insure that sufficient power is available to prevent a stall or in case the approach is missed and the aircraft has to go around again. At the same time the pilot must monitor and maintain a correct rate of descent while keeping the aircraft properly headed in azimuth during the approach. Also, the pilot must be aware of his "decision" altitude, that is, the minimum altitude at which he must see the runway lights in order to make the proper decision to land the aircraft safely or, if he does not see the runway lights, to apply power and go around again. Since all of these functions require that the pilot look at instruments located below the windshield, in the present cockpit instrument layouts, and, consequently, as the pilot reaches the "middle marker" of the radio beacon where he is supposed to begin to land the aircraft visually, he is often too busy to take his eyes away from the instruments and look out the windshield.

The present invention is directed to a simplified aircraft instrument system to aid a pilot in flying and landing an aircraft with all of the necessary instrument information while still permitting him to have a substantially full field of view through the aircraft's windshield. In accordance with the invention, the azimuth steering, portion of the instrument landing system (ILS) information and other flight information are located in a transparent display mounted on top of the cockpit cowl to enable the pilot to see through the display and windshield. This gives the pilot substantially full visual contact at all times. The transparent display is used in conjunction with a device which produces an audio signal corresponding to the rate of aircraft altitude change. Preferably, a first type of a tone such as a series of intermittent signals, is produced when the aircraft is ascending and a steady tone when the aircraft is descending. The frequency of both tones increase as the rate of change of either ascent or descent decreases. During descent, which is particularly critical in a landing, the pilot listens to the variable frequency tone and when it differs from a predetermined frequency he knows that the aircraft's rate of descent must be adjusted to properly land the aircraft. This is easily done by changing the attitude of the aircraft and listening for the corresponding change in pitch of the tone. The pilot knows quite readily when he is ascending when the tone changes from steady state to intermittent.

In the preferred embodiment of the invention, an altimeter is made part of, or used in conjunction with, the display. The scale of the altimeter is adjustable so that the pilot can easily see his decision altitude in direct relationship to the attitude of the aircraft at any time. Therefore, by using the audio signals in conjunction with the visual display, the pilot is readily and positively provided with all of the steering information he needs for flying and landing the aircraft.

It is therefore an object of the present invention to provide an aircraft flight instrument system utilizing a "see-through" instrument display.

Another object is to provide aircraft flight instrument system utilizing a device for giving the pilot audio information on the vertical velocity of the aircraft.

An additional object is to provide an aircraft flight instrument system using a vertical velocity measuring device for producing a tone signal corresponding to the aircraft's rate of change of altitude and a see-through instrument panel to aid the pilot in performing various aircraft flying and landing functions.

Figure 6:
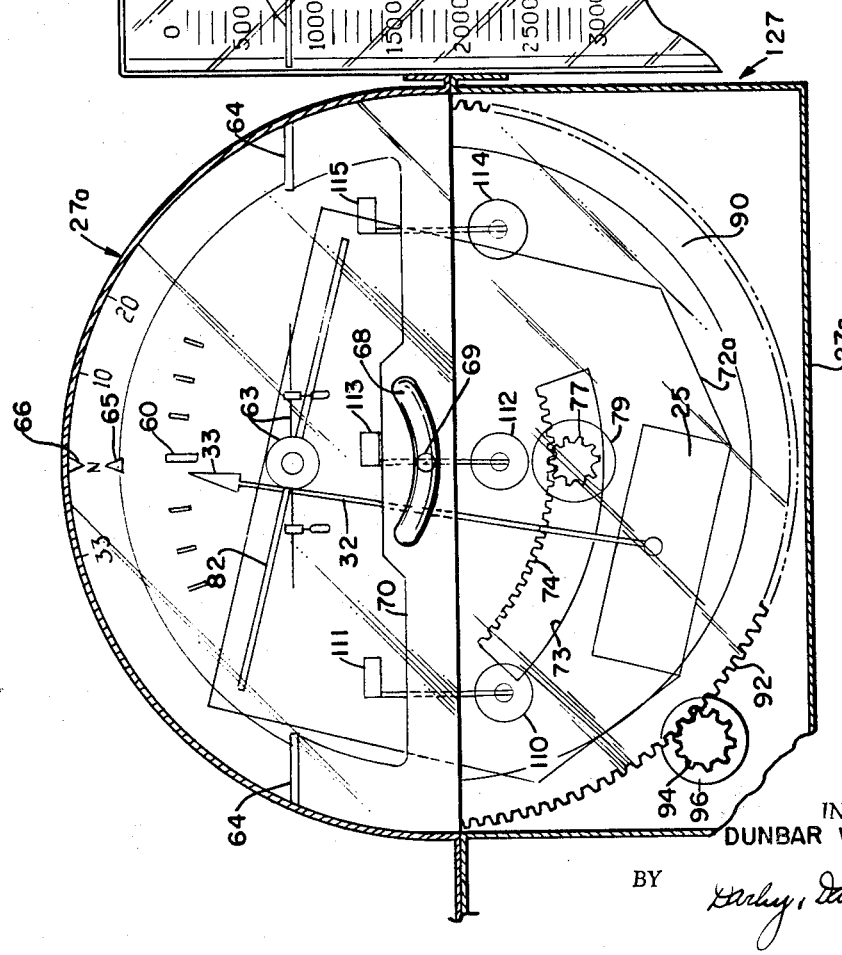

Other objects and advantages of the present invention will become more apparent upon reference to the following specification and annexed drawings in which:

FIGURES 1A and 1B are schematic block diagrams of portions of the overall system of the present invention; FIGURE 2 is a schematic block diagram representation of the tone producing circuits; FIGURE 3 is a schematic diagram of the intermittent tone generator device of FIG. 2; FIGURES 4 and 5 are front and side views of a preferred embodiment of instrument panel; FIGURE 6 is a front view of another embodiment of instrument panel; and FIGURE 7 shows the mounting of the instrument display on the aircraft cowl.

FIGURE 1B is a schematic block diagram of the flight instrument system portion of the present invention. Conventional glide slope and VOR omnirange receivers 10 and 12 are provided with their respective radio frequency antennas 11 and 13. These receivers and antennas operate in the conventional manner to produce signals on their respective output lines 14 and 15. These signals drive the respective horizontally and vertically extending pointers 21 and 22 of corresponding connected glide slope and azimuth meters 16 and 17 of a conventional flight director indicator 19. Indicator 19 is conventional in construction and operation and it is normally located in the cockpit below the windshield cowl together with the altimeter and vertical velocity (rate of change of altitude) meter, if the latter is used.

In accordance with the present invention the azimuth steering output signal on line 14 from receiver 12 drives a second meter 25 of a "see-through" indicator 27. Meter 25 moves a second azimuth steering pointer 32 which presents the same information as pointer 22 of display 19. A horizontal pointer 29 of a radar altimeter indicator 28 is driven by signals from a radar altimeter 30, or other suitable altimeter device. The radar altimeter indicator 28 can be made part of indicator 27 if desired. However, as described below, a separate altitude indicator is used to permit selection of the "decision altitude." Thus, the auxiliary display of indicators 27 and 28 presents both azimuth steering and altitude information, plus other information to be described below.

It is sufficient to say at this time that the display panel of indicator 27 is substantially transparent and both indicators 27 and 28 are mounted on top of the cowling in front of the windshield of the aircraft. Indicator 27 is described in detail below.

A pair of switches 34 and 35 are connected in signal line 14 from the altimeter 30 and in line 15 from receiver 12 to disable indicators 27 and 28 when desired. These switches 34 and 35 also can be constructed to disable indicator 19 when indicator 27 is operative.

The other part of the flight instrument system of the present invention is shown in FIG. 1A and comprises an audio portion which includes a marker receiver 40 of conventional construction and its associated antenna 41. The marker receiver picks up the radio marker beacons which are located adjacent the airport and are used in making an instrument landing. These markers are commonly termed the outer marker (OM) and the middle marker (MM). Each of these markers is essentially a narrow vertical beam of radio energy which is located in the approach to the airport and is characterized by a particular signal formed of a number of dots and/or dashes. These signals are commonly used to give both the identity of the airport station and to identify whether it is the middle marker or the outer marker signal which is being received. The output of receiver 40 is applied to the movable contact arm of deck 42b of a two deck switch 42. A pair of headphones 44 is connected to the output side of switch 42.

The audio portion of the system includes a vertical velocity measuring instrument 45 which receives altitude (pressure) information and produces an output signal which is proportional to the rate of change of altitude of the aircraft. This output signal controls a tone generator 47 whose output is applied to deck 42a of switch 42. Tone generator 47 produces two separate tones having different characteristics depending upon whether the aircraft is ascending or descending. For ascent, a broken or intermittent tone is produced while a steady state tone is produced for descent. The frequency of each tone varies depending upon the respective rate of ascent or descent.

Depending upon the setting of switch 42 the headphones 44 receive either the output of the tone generator, in position "1"; the output of the marker receiver only, in position "2"; or the outputs of both the marker receiver 40 and the tone generator 47 in position "3."

Before describing the operation of the system, reference is made to FIG. 2 which shows the details of the tone producing circuit. Here the vertical velocity measuring instrument 45 has two output lines 151 and 152 in which is connected a respective oppositely poled diode 153 and 154. Vertical velocity measuring instrument 45 is of conventional construction and measures the rate of change of aircraft altitude and produces signals corresponding thereto. Preferably, an instrument 45 is used in which aircraft climb is indicated by a positive electrical signal and aircraft descent by a negative signal. These signals increase in amplitude in correspondence with an increasing rate of climb or descent, and in a level flight condition no output signal is produced. A conventional barometric vertical velocity indicator can be used with a suitable potentiometer pickoff driven by its pointer to produce this function. Devices are also commercially available for producing the electrical output signals directly one such device being manufactured and sold by Continental Development Corporation of Virginia.

The positive "up" signal on line 151 passes through diode 153 to an amplifier 155 and then to an intermittent tone generator 157. Tone generator 157 produces a broken, or intermittent tone, whose frequency increases with increasing rate of ascent. This is indicated by a higher voltage at the output of amplifier 155 applied to generator 157. The output of generator 157 is applied through an amplifier 159, which has controllable volume, to the headphones 44.

FIG. 3 shows the details of one circuit which can be used for the intermittent tone generator 157. This circuit uses a square wave generator which includes a silicon controlled switch 170 whose anode 171 is supplied with operating voltage from the variable output of amplifier 155, in accordance with the rate of climb of the aircraft, through a resistor 172. The cathode 173 of the switch is returned to ground through a coil 175. The gate electrode 176 adjacent the anode is unconnected while the gate adjacent the cathode 177 receives firing voltage from the junction of a voltage divider formed by resistors 178 and 179. The latter resistor is originally selected to produce a predetermined base amplitude and frequency at the lowest supply voltage supplied to anode 171. A capacitor 180 shunts the anode to the circuit point of reference potential. The output frequency of the square waves of the circuit of FIG. 3 increases in response to an increased supply voltage from amplifier 55. This produces the desired intermittent tone for ascent. The circuit of FIG. 3 is described in Chapter 19, at page 361 of the General Electric Transistor Manual, sixth edition, 1962. While one circuit is disclosed here, other suitable conventional circuits also can be used.

To produce the variable frequency, steady-state tone, the negative "down" voltage is passed through diode 154 to an amplifier 156.

The output voltage from amplifier 150, which increases in amplitude as the rate of descent increases, is used to control the impedance of a variable impedance element 158 which is located in the frequency determining circuit of the variable frequency tone generator (oscillator) 160. Element 158 can be a reactance tube circuit or, more preferably, a voltage sensitive impedance such as a voltage sensitive capacitor whose capacitance changes with the applied voltage or a saturable reactor whose inductance changes. In any event, whichever of these elements is used in a conventional variable frequency tone generator circuit, it is connected to increase the pitch of output tone of the generator in correspondence with an increasing rate of descent. The output of oscillator 160 is also applied to the amplifier 159 which drives the headphones 44. Thus, the pilot is provided with audio information of the rate of ascent and descent.

FIGURES 4 and 5 show one embodiment of the instrument display of the present invention. Here indicator 27 is formed as an integral package with portions 27a and 27b respectively extending above and below the cockpit glare shield or cowl 50. Upper portion 27a has front and back transparent plastic or glass pieces 52 and 53 which are spaced apart to form a hollow central section. A cover member 55 is fastened on the periphery of the two pieces 52 and 53 and holds them together. Member 55 can serve as a glare shield and also can contain edge lighting for the instrument if desired. The latter technique is, of course, conventional in the art.

The face of front piece 52 is scribed or etched with ILS azimuth steering indicia such as the center mark 60 and a number of other marker lines on either side thereof to indicate the number of degrees departure from the selected ILS heading of the aircraft. A simulated aircraft 63 with a zero reference attitude (horizontal line indicating zero bank or level flight and a centered nose indicating selected ILS heading) is also placed on the front piece 52. Marker lines 64 are located on the edges of the instrument aligned with the horizontal line of the simulated aircraft 63 to aid in the interpretation of the display. A compass heading marking 66, which is etched, scribed or painted on piece 52 is located vertically above the nose of the simulated aircraft 63 in a conventional manner.

The upper portion 27a of the display also contains a conventional slip indicator 68 which is the usual arcuate tube with ball bearing 69. Slip indicator 68 is surrounded by an opaque portion 70 on the face of piece 52.

The lower portion 27b of the indicator houses the lower portion of a bank indicator card 72. An arcuate drive gear 74 extending approximately 30° on each side of the center of the bank card is mounted on its lower edge with a stop pin 75 at each end thereof. Bank card 72 is driven by a pinion gear 77 on remote syncro repeater 79 connected to the aircraft's bank measuring device. The latter is usually a gyro or other similar device. The bank card 72 is also made of transparent material, and its center is suspended on a pivot 80 located behind the slip indicator. A single horizontal line 82 is etched or scribed on the portion of bank card 72 extending into transparent section 27a. When line 82 is aligned with indicia 63 and 64, the aircraft is flying level and has no bank attitude. Turning of line 82 in one direction or the other indicates bank.

A transparent compass card 90 having suitable indicia from 0–360° marked or etched thereon is also located within the indicator 27. Compass card has a ring gear 92 completely around the outer periphery thereof, which is driven by a pinion gear 94 connected to a repeater synchro 96 of the aircraft's directional gyro. The indicia on the compass card line up with heading marker 66 to give he magnetic heading of the aircraft in the conventional manner.

The lower section 27b of the indicator also houses the VOR/ILS meter 25 which drives the ILS pointer 32. Pointer 32 is also preferably made of relatively small diameter or thickness clear plastic with an enlarged upper portion 33. If desired, pointer 32 can be made of "Lucite" and provided with a lamp (not shown) at the bottom thereof so that the edges or the tips 33 are illuminated.

To complete the indicator, three warning flag meters 110, 112 and 114 are provided. Each of these three meters drives a respective flag 111, 113 and 115 which is used for the HDG (heading), ROLL and NAV (navigation) warning flags. These three flags respectively indicate whether or not each of the compass (HDG), roll indicator measuring device and navigation localizer receiver 12 (NAV) is operative. Flags 111, 113 and 115 are each arranged to go behind the opaque portion 70 of the display when the corresponding metered system is not working.

As shown most clearly in FIGURE 4, the readout meter 28 for the radar altimeter 30 is mounted alongside, to the right, of indicator 27. Meter 28 is of the pancake type and has a scale of 130 calibrated in feet adjacent which the altitude pointer 29 moves. A rack gear 32 is mounted on one side of the meter 28 to move it up and down through the cowl 50 by a pinion gear 134 turned by a control knob 135. By turning knob 135 scale 130 is moved up and down with relation to the indicia 64 of meter 27. The "decision altitude" of the aircraft is set opposite the indicia 64 by adjusting the control knob 135. Therefore, the pilot is made fully aware of the altitude of the aircraft with relationship to the decision height when the pointer 29 is also aligned with the indicia 64.

Utlization of the flight system of the present invention greatly simplifies flying the aircraft, particularly in making landings. To maintain visual contact while flying the aircraft. The pilot looks at indicator 27 and keeps the aircraft on the omni radial or ILS course by keeping pointer 32 centered on marker 65. If any correction is needed the pilot rolls or banks the aircraft, this being indicated by rotation of the bank card 72. Ascent or descent of the aircraft, and the rate of the same is given to the pilot over headphones 44.

During a landing approach, the pilot flies the ILS course by keeping pointer 32 centered. He monitors his rate of descent by listening to the tone and, if the tone differs from the tone signifying the correct rate of descent, he adjusts the rate of descent of the aircraft accordingly.

At the same time the altitude of the aircraft is decreasing, the pilot watches the pointer 29 on the altimeter indicator 28 located adjacent the meter 27. When the pointer 29 reaches the preset decision height on indicator 28 adjacent the indicia 64, if the pilot cannot see the runway at this time for visual landing, he knows that he must apply power to make a fly-by. With the indicia 82 on the bank card lined up with the indicia 63 and 64 the pilot knows that the aircraft is flying level and with pointer 33 aligned under the marker 65 he knows he is flying on the proper course. Therefore, it can be seen that the present invention provides the pilot with all of the information he needs to fly and land the plane without looking below the cowl 50. Thus, he has full visual contact available to him at all times when using the audio portion of the system and the indicators 27 and 28.

FIGURE 6 shows another embodiment of indicator 127 which is similar to the indicator of FIGURE 4 with the exception of the mounting of the VOR/ILS meter 25. Here, meter 25 is mounted on the bottom of the bank card 72a which now is extended lower than shown in FIGURE 4. The bank card has an arcuate slot 73 to accommodate the arcuate shaped gear 74 driven by the remote bank indicator syncro. The indicator of FIGURE 6 operates in the same general manner as the indicator of FIGURE 4. Here, however, pointer 32 now serves a function which is analogous to a course director in conventional aircraft flight director system instrumentation.

As should be apparent, when the aircraft is banked the pointer 32 will be physically moved by a number of degrees corresponding to the bank of the aircraft due to the movement of the meter 25 on the bank card 72a. Therefore, the pointer 33 becomes centered on the marker 65. It is only necessary for the pilot to steer the aircraft to keep the pointer 33 centered on the marker 65 in the same manner as flying with a course director instrument. In the case shown in FIGURE 6, the pilot continues to fly the aircraft with pointer 33 centered by gradually reducing bank to eventually level the indicia 82 to line up with the simulated aircraft 63 and the other indicia marks 64.

The indicator of FIGURE 6 provides a relatively inexpensive course director type of instrumentation. Whereas a conventional course director instrument utilizes a computed signal provided by rather complicated electronic equipment, the indicator signal produces an analogous course director signal mechanically. While the indication may not be as accurate as that produced by a conventional course director signal, it is usually sufficient for most flying purposes and is made possible by only a relatively simple modification to the instrumentation system of FIGURE 4 or of any other similar conventional meter. While the course director is shown in conjunction with the "see-through" indicator 27 it should be realized that it can be utilized with a conventional type meter.

FIGURE 7 shows the location of the instrumentation system of FIGURE 4 on a conventional aircraft. As seen, the indicator 27 and the altimeter indicator 28 are located on the top of the cowl in the windshield on the right hand seat, which is the pilot's seat, as far forward on the cowl as possible. As should be apparent all of the instrumentation under the cowl are visible to the pilot in a conventional manner. The pilot merely has to look up to indicators 27 and 28 to obtain the flight information and visual contact at the same time.

In addition to the instrument landing approach application for the system described above, the system also has many other uses. For example, when an aircraft is making a circling approach on VFR, with or without reduced visibility the aircraft is generally set to fly level at a predetermined altitude. The pilot can readily maintain this altitude by watching altimeter indicator 28 and listening to the audio tone, to see if there is any vertical velocity and can maintain his course by watching the compass card and the pointer 32. Even while doing this, the system of the present invention permits the captain to look out his windshield for other aircraft which might possibly cause a threat instead of looking down at his instruments in the conventional manner.

A similar application exists while cruising on IFR where the pilot must check for other aircraft. The audio tone and altimeter indicator 28 gives the pilot an indication of his altitude without having to look down at the main panel and also provides an azimuth indication. Therefore, the pilot is free to look outside of the aircraft to determine other approaching planes.

While preferred embodiments of the invention have been described above, it will be understood that these are illustrative only, and the invention is limited solely by the appended claims.

What is claimed is:

1. An aircraft flight control system comprising: means for measuring the vertical velocity of an aircraft, and means connected to said measuring means for producing first and second audio signals respectively characteristic of the velocities of the aircraft in the respective upward and downward directions, one of said first and second signals being a substantially continuous signal whose frequency varies in relation to the aircraft vertical velocity in one direction and the other of said first and second signals is an intermittent signal whose frequency varies in relation to the aircraft vertical velocity in the other direction.

2. An aircraft flight control system operating in response to an output signal corresponding to the position of the aircraft with respect to a radio signal comprising: indicator means having a substantially transparent see-through portion, meter means responsive to said output signal, position indicating means movable by said meter means and having a portion thereof located in the transparent portion of said indicator means for displaying said position while permitting the aircraft pilot to maintain visual contact through the transparent portion of said indicator means, altimeter means for measuring the altitude of the aircraft, a reference indicia on the face of said indicator means, said altimeter including a scale calibrated in units of distance and an altitude display means which is movable with respect to said scale, and means for positioning said scale with respect to said indicia so that said altitude display means is aligned with said indicia at a predetermined height.

3. An aircraft flight control system as in claim 2 further comprising means responsive to the bank attitude of the aircraft and associated with said indicator means for displaying the aircraft bank attitude, said bank display means being substantially transparent.

4. An aircraft flight control system as in claim 3 wherein said bank display means has indicia thereon which is to be aligned with the reference indicia on the transparent portion of said indicator means when the aircraft is flying in a level attitude.

5. An aircraft flight control system as in claim 3 further comprising means for measuring the vertical velocity of an aircraft, and means connected to said measuring means for producing first and second audio signals respectively characteristic of upward and downward velocities of the aircraft.

6. An aircraft flight control system as in claim 2 wherein the scale and display means portions of the altimeter are in a separate unit located adjacent the transparent face of said indicator means.

7. An aircraft flight control system as in claim 2 further comprising means responsive to the bank attitude of the aircraft and associated with said indicator means for displaying the aircraft bank attitude, said bank display means being substantially transparent and having attitude indicia thereon which is to be aligned with the reference indicia on the transparent portion of said indicator means when the aircraft is flying in a level attitude.

8. An aircraft flight control system as in claim 2 further comprising means for measuring the vertical velocity of an aircraft, and means connected to said measuring means for producing first and second audio signals respectively characteristic of upward and downward velocities of the aircraft.

9. An aircraft flight control system as in claim 2 wherein said indicator means includes means movable in a manner corresponding to the bank attitude of the aircraft, means mounting said meter means to be moved by movable bank attitude means so that the movement of said position indicating means corresponds to both the bank of the aircraft and its position with respect to a radio signal.

References Cited

UNITED STATES PATENTS

| | | | |
|---|---|---|---|
| 974,103 | 10/1910 | Lentz | 73—179 |
| 2,051,827 | 8/1936 | De Florez | 340—27 |
| 2,732,538 | 1/1956 | De Celles | 343—108 |
| 2,892,180 | 6/1959 | Smith | 73—178 |
| 3,037,382 | 6/1962 | Aid et al. | 73—178 |
| 3,117,312 | 1/1964 | Watson | 73—178 X |
| 3,128,623 | 4/1964 | Gold | 73—178 |
| 2,395,368 | 2/1946 | Bull | 340—27 |

DAVID SCHONBERG, *Primary Examiner.*

N. B. SIEGEL, *Assistant Examiner.*